Aug. 9, 1955  G. BARRADAS  2,715,087
METHOD OF SEALING THE OPEN END OF A THERMOPLASTIC TUBE
Filed Feb. 16, 1953  2 Sheets-Sheet 1
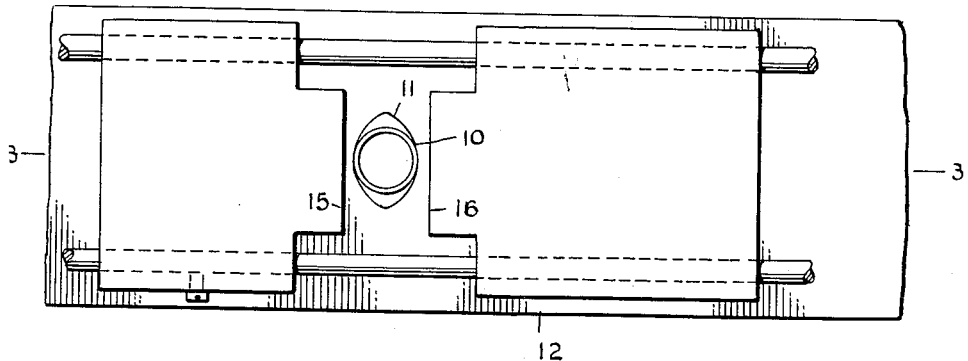
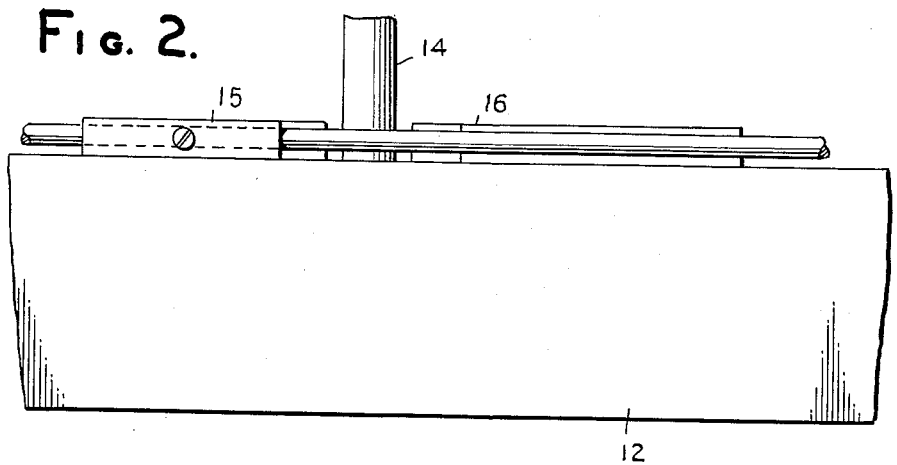
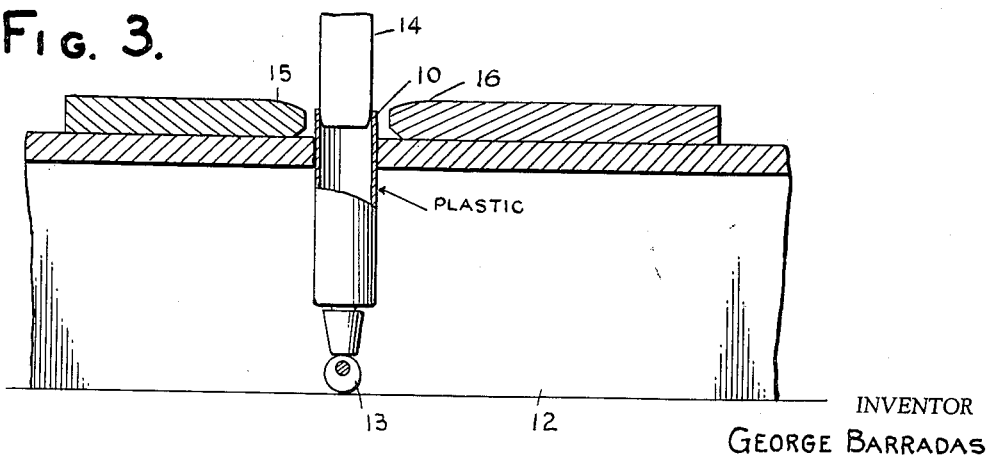
INVENTOR
GEORGE BARRADAS
BY
J. P. Wetherell
ATTORNEY

United States Patent Office 2,715,087
Patented Aug. 9, 1955

2,715,087

METHOD OF SEALING THE OPEN END OF A THERMOPLASTIC TUBE

George Barradas, North Tarrytown, N. Y., assignor to PM Industries, Incorporated, Stamford, Conn.

Application February 16, 1953, Serial No. 337,139

1 Claim. (Cl. 154—83)

This invention relates to a method and process for sealing tubes of thermoplastic material. Heretofore, tubes or vials of thermoplastic material have been closed by clamping the ends between heated dies so that the heat is applied to the outside surfaces of the tube and produces an adhesion of the insides of the ends of the tube. This does not give satisfactory seals when the tube has a heavy wall section.

The object of this invention is to close by means of a seal the end of a vial or tube made of thermoplastic material in such a manner as to produce a non-porous seal regardless of wall thickness.

Another object of this invention is to produce this closure with the least amount of decomposition of the plastic material.

It is still another object of this invention to form a closure that will not transmit gases or vapors, in particular, water vapor.

Prior methods of closing vials or tubes of heavy wall section have produced incomplete seals due to decomposition of the plastic because the heat has been applied to the exterior surface of the tube, and the sides of the tube then forced together while in contact with the heating unit in such a manner that there is partial adhesion between the opposing sides of the tube.

Plastic materials are well known to be sensitive to heat and a small difference lies between the melting point of the thermoplastic material and the temperature at which the materials char, which causes porosity in the closure. The present method heats the interior surface of the opposing sides and then compresses these sides together. This reduces the amount of heat necessary to produce the desired results of softening the contacting surfaces, because the heat is applied directly to the surfaces to be softened and not to the remote surfaces as has heretofore been the practice. The heat therefore does not have to travel the thickness of the sheet with the subsequent loss due to the insulating qualities of the thermoplastic material. More careful temperature control is possible and closures are produced for the first time that are satisfactory in every respect, in particular, to produce a true seal.

Figure 4:
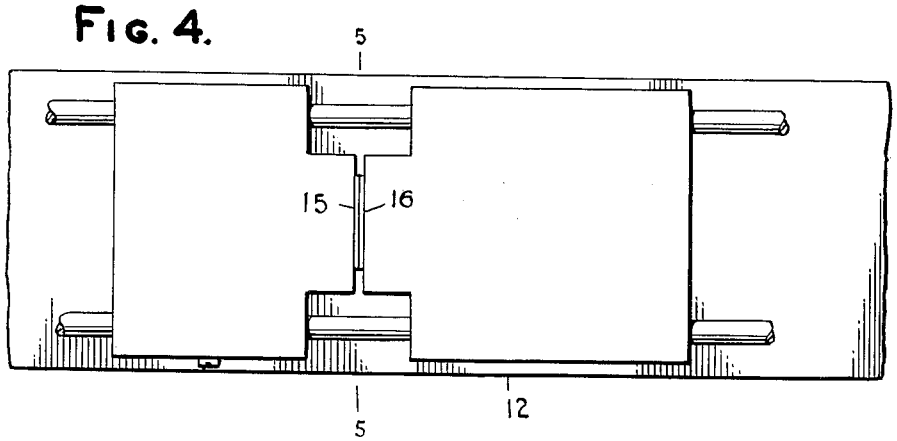
Figure 5:
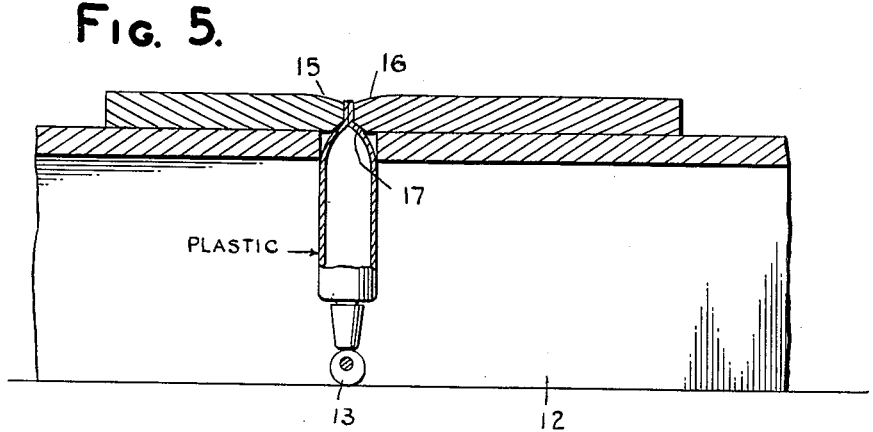

To accomplish these and other objects of the invention, as hereinafter pointed out, the structure shown on the accompanying drawings is presented as one embodiment of this invention, wherein:

Figure 1 is a horizontal view of the closing device;
Figure 2 is a side view of said device;
Figure 3 is a sectional view taken on line 3—3 of Fig. 1;
Figure 4 is a horizontal view with the compression unit closed;
Figure 5 is a sectional view taken on line 5—5 of Fig. 4.

One embodiment of the invention is the sealing of tubes and vials as illustrated in the accompanying drawings. The vial 10 is placed in the hollow receptacle 11, in the block 12, where it is centered at the proper height by means of the cam device 13, shown in Fig. 3. This vial is then ready for the fusing step wherein the heater 14, shown in Figs. 2 and 3, is inserted within the tube to heat the interior surfaces thereof. This heater fits the tube snugly and softens the surface that it contacts. The heater 14 is then withdrawn and the jaws 15, 16 shown in Figs. 1 and 3 are forced together and assume the position shown in Figs. 4 and 5 forcing the end of the tube into contact in a straight line at the center of the tube as shown in Fig. 5 and forms a seal therein.

The receptacle 11 that receives the tube must be cut away as shown in Fig. 1 to allow for the expansion of the end of the tube during the closing operation. There must be no compression or force exerted against the sides of the tube near the seal during and immediately following the compression step. The jaws themselves must be bevelled at their lower edges, as shown at 17 in Fig. 5 so as to allow for the bending of the tube during the sealing operation. The amount of pressure exerted by the jaw is dependent on the type of tube and the wall thickness of the tube to be closed. These jaws, of course, leave an impression on the tube end and this impression may contain a trademark, a label or other characters which will be impressed into the plastic material and are not removable without breaking the closure. The heater 14 shown in Fig. 3 is usually made of copper and may be coated with a metal plating, such as chromium, nickel, etc. or with plastic material such as "Teflon" to prevent adhesion and to give the proper polish and heat conductivity so that the heat in part 14 will be transmitted to the interior surface of the tube 10 and it is allowed to remain in contact with the tube for a length of time sufficient to soften this surface. This also depends on the type of material and on the thickness of the tube wall, for example, nylon, polyethylene and polyisobutylene-polyethylene blends have been tried and found satisfactory. The length of time that the heater remains in contact with the tube is sufficient to soften a portion of the tube wall thickness, usually not more than half of said thickness. This sealing method can also be accomplished without having the contact of a hot tool with the inner wall, that is, through radiation. A method of generating enough heat to soften the material is all that is necessary. The heater 14 may be fixed with relation to its shaft or it may be rotated on this shaft. Immediately after the closure is formed by the jaws 15—16 the excess material, forced upwardly by these parts may be removed while the material is still soft.

Nylon tubes have been made and have the characteristics of this material. They are more rigid than the polyethylene tubes and more resilient. The closures are satisfactory in every respect and show resistance to moisture and vapor transmission. The polyethylene tubes are soft and flexible and give a perfect closure by the method disclosed in this invention. Polyethylene-polyisobutylene blend containing 7½% of the latter material have also been prepared and closed by this method, which tubes have superior characteristics, and the method of this invention also produces perfect seals. Similarly a 15% and a 30% blend have been prepared and make into vials with their well known superior physical characteristics, which have given the formation of perfect seals.

Table

| Material | Wall Thickness, inches | "Heater" Entering Tool, Temperature, °F. |
|---|---|---|
| 1. Nylon | .030 | 450–1,000 |
| 2. Polyethylene | .025 | 190– 850 |
| 3. Blend Polyethylene, 7½% polyisobutylene | .030 | 190– 850 |
| 4. Blend Polyethylene 15% polyisobutylene | .030 | 190– 850 |
| 5. Blend Polyethylene, 30% polyisobutylene | .030 | 190– 850 |

This process may be varied from that shown in the preceding example by having the jaws 15—16 partially closed before the insertion of the heater which must then be of a flat type and will allow this heater to be inserted in the comparatively narrow slit remaining between the jaws. This has the added advantage that the jaws will remove the heat from the material before the contents of the tube could be raised in temperature.

Similarly, the principle illustrated in producing flat seals on vials may be employed in inserting the bottom in a plastic bottle wherein the interior sides of the end of the receptacle are heated by means of a metal heater similar to 14 shown in Fig. 3. Then a mandrel holding the bottom, which has been heated on the contacting surface is forced into the end of the bottle and pressure applied between the mandrel and the exterior surface of the bottle, that is, the two plastic surfaces to be bonded are heated and then contacted and pressure applied to form a seal.

The use of plastic bottles is rapidly becoming one of the major changes in the container industry of today. These bottles are not frangible and allow the compression of the sides thereof to extrude the contents in whole or in part. These bottles are all made by a process that includes the blowing of the bottle and may not be made by the more common and cheaper method of being formed in an injection press.

The novel process of this invention will allow the manufacture of such bottles by any method and then the insertion of the bottom after filling the bottle, which section may be thick or thin to give the desired characteristics to the finished article.

The seal produced by this process allows the extensive use of plastic vials which have heretofore only come into very limited use, principally because the closing does not produce a perfect seal and water vapor transmission allowed the loss of the contents or the contamination of the contents. The prior processes did not give an article that would maintain the product packed therein in perfect condition. Vials are usually made by injection molding thermoplastic material and usually have a preformed opening device molded therein. The method of this invention allows the closing after filling of these vials and the production thereon of a perfect seal.

This method of closing a plastic container having opposing sides by heating the interior surfaces thereof may have many applications other than those described in this application, as will be apparent to anyone skilled in the art.

What is claimed is:

A method of sealing the open end of a thermoplastic tube which comprises inserting a heating element within the marginal and sealing area of said tube, heating the interior surfaces to soften the same, withdrawing the heating element and compressing the heated marginal surfaces to close the end of the tube and form a permanent seal thereon.

References Cited in the file of this patent

UNITED STATES PATENTS

| | | |
|---|---|---|
| 2,132,783 | Goldmark | Oct. 11, 1938 |
| 2,233,945 | Gurwick | Mar. 4, 1941 |
| 2,383,230 | Voke | Aug. 21, 1945 |
| 2,387,566 | Custers | Oct. 23, 1945 |
| 2,556,476 | Lamport | June 12, 1951 |
| 2,597,704 | Carlson | May 20, 1952 |
| 2,614,953 | Anglada | Oct. 21, 1952 |
| 2,678,471 | Barton | May 18, 1954 |
| 2,679,469 | Bedford | May 25, 1954 |